(No Model.) 2 Sheets—Sheet 1.

H. M. DU BOIS.
CUSHION TIRE FOR VEHICLE WHEELS.

No. 544,217. Patented Aug. 6, 1895.

Witnesses,
Robert Everitt
Thos. A. Green

Inventor,
Howard M. Du Bois.
By James L. Norris.
Atty.

UNITED STATES PATENT OFFICE.

HOWARD M. DU BOIS, OF PHILADELPHIA, PENNSYLVANIA.

CUSHION-TIRE FOR VEHICLE-WHEELS.

SPECIFICATION forming part of Letters Patent No. 544,217, dated August 6, 1895.

Application filed August 2, 1894. Serial No. 519,305. (No model.)

*To all whom it may concern:*

Be it known that I, HOWARD M. DU BOIS, a citizen of the United States, residing at Philadelphia, in the county of Philadelphia and State of Pennsylvania, have invented new and useful Improvements in Cushion-Tires, of which the following is a specification.

My invention relates to cushion-tires, my purpose being to reinforce their elasticity and prevent noise and rattling, besides securing a largely-increased durability, strength, and economy in the manufacture and use of the wheels provided with such tires.

It is my purpose also to provide a vehicle-wheel comprising a rim, a tire having flanges, and an elastic cushion normally of greater width than the rim and of greater thickness than the space occupied by it between the tire and the rim, the tire having its flanges overlapping the sides of the rim and being compressed against the face and sides of the cushion and against the sides of the rim, whereby permanent elasticity is secured, the wheel is prevented from becoming "rim-bound," and the necessity of resetting the tire does not exist.

It is my purpose also to provide a vehicle-wheel having a taper-rim, a tire having taper-flanges, and an elastic cushion combined and arranged in the manner specified above and for a like purpose.

To enable others to fully understand and to make and use my said invention, I will proceed to describe the same in detail, reference being had for this purpose to the accompanying drawings, in which—

Figure 1:
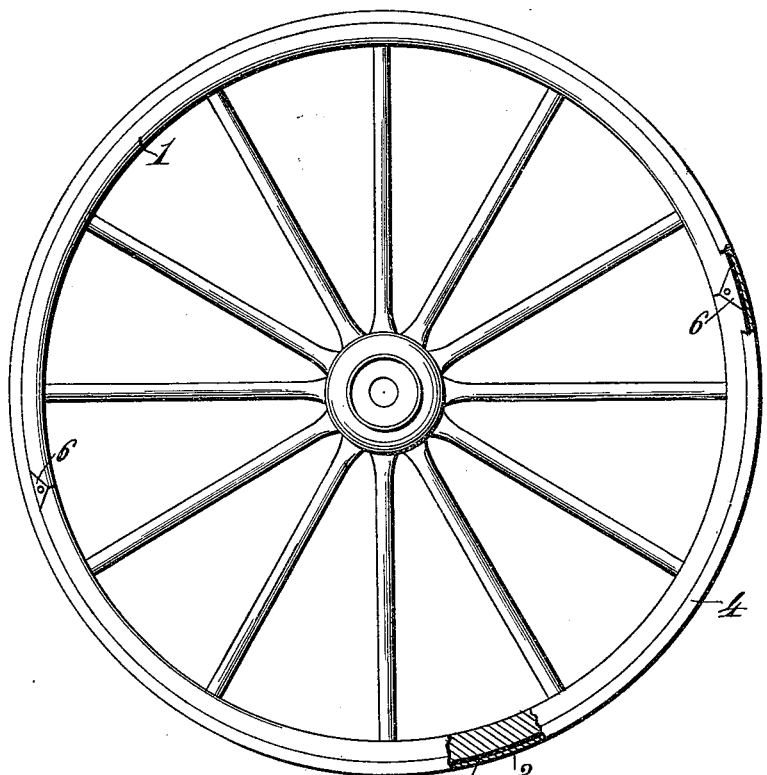
Figure 2:
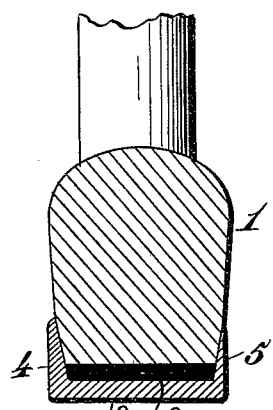
Figure 3:
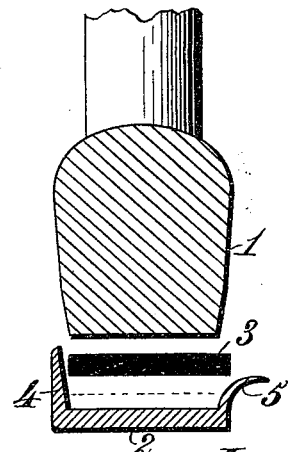
Figure 4:
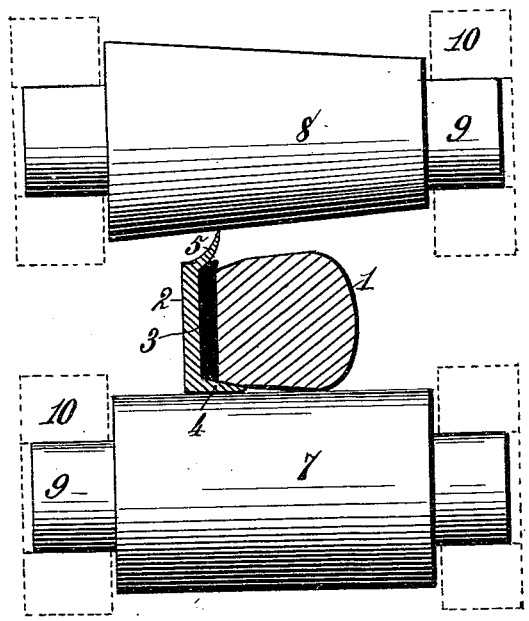

Figure 1 is a side elevation of a vehicle-wheel in which my invention is embodied, a portion being broken away to show the construction of the tire. Fig. 2 is a transverse section of the rim of the wheel shown in Fig. 1. Fig. 3 is a detail view showing the rim, the elastic cushion, and the metallic tire in their proper relative positions, but separated slightly to show the normal expansion of the elastic cushion and the form of the tire before it is applied. Fig. 4 is a view showing a form of mechanism adapted for compressing the flanges of the tire upon the rim of the wheel against the sides of the elastic cushion.

The reference-numeral 1 in said drawings indicates the rim of a vehicle-wheel of ordinary construction. It has been customary heretofore to apply both elastic and non-elastic tires to these wheels by various methods, that most commonly practiced being to heat the tire and when expanded place it upon the rim and shrink it thereon, after which bolts or rivets are inserted in the tire and rim to retain the former in place. Rubber or other elastic material has also been interposed between the rim and tire in many different forms of construction.

In all those cases in which the tire is expanded by heat before application its shrinkage causes the wheel to become "dished" from the rim to the center, the amount of this concavity being regulated by the degree of shrinkage allowed in the tire. These wheels, after a certain term of use, settle at the periphery and become "rim-bound," as it is technically termed, and when this condition is reached the tire must be cut and reset or the wheel is worthless. It is also found in practice that the rims of wheels usually allow the shoulders upon the spokes to become embedded to some degree, which results in the protrusion of the ends of the tenons until they rest upon the tire. This difficulty also renders it necessary to remove the tire and trim off the ends of the tenons to prevent them from crooking laterally. In all the elastic tires, also, of which I have knowledge, trouble has been experienced in practical use, due in most cases to the fact that after the elastic cushion has remained for some time in use and under compression by the tire it seems to part with its elasticity, and the tire, becoming loose, rattles and may become detached, besides failing to give proper support to all parts of the periphery of the wheel. Upon the flat ground-surface of the rim 1 of the wheel I place a cushion 2 of rubber or other suitable elastic material, its width being in excess of the width of the periphery of the wheel, as shown in Fig. 2.

The metal tire consists, in my invention, of a flat strip 3 of suitable thickness, provided upon its parallel edges with flanges 4 and 5, which taper or diminish in thickness from the point where they unite with the strip 3 to their edges. I prefer to construct these flanges as shown in Fig. 2, their outer faces being substantially at right angles with the strip 3, while the inner faces diverge. It is desirable, also, that the lateral faces of the rim 1 of the wheel be beveled off in such manner that the flanges of the tire shall be flush, or substantially so, with the felly. The flange 5, which lies upon the inner side of the wheel, may also be of less width and somewhat less in thickness than the other flange.

When the tire is made, or before it is applied to the wheel, one of the flanges is bent or turned outward and brought into such relation to the flat strip 3 that when expanded it may be placed upon the rim of the wheel over the elastic cushion 2. The tire, constructed as described, is welded with a suitable allowance, whereby it will shrink upon the rubber cushion when cooled from a heat of less that 200° Fahrenheit. The elastic cushion, which is of greater width than the space between the diverging faces of the flanges 4 and 5, and of greater thickness than the space occupied by it between the tire and rim, is forced down on the forward edge of the channel and cemented, Fig. 3, so that it will be held while the tire is passed over the rim of the wheel. The tire is then heated to a temperature not injurious to the elasticity of the cushion, and while hot is placed on the wheel. In shrinking it compresses the cushion to a certain degree, and the full degree of compression is produced by pressing the flange 5 down upon the beveled lateral face of the rim 1. This operation may be performed in different ways, the most convenient being to roll the flange down, though I do not limit my present invention to any specific means for this purpose. I usually turn or bend the inner flange 5 of the tire outward, this being the thinner and therefore the most easily manipulated. When pressed into place, as shown in Fig. 2, the elastic cushion is compressed from its margins or edges toward its center, and being reduced thereby to the width of the channel in the tire, its elastic tension is largely increased, and such pressure is exerted upon the tire that it is held with all necessary firmness and requires no rivets, bolts, or other additional fastenings, which weaken the rim at every point where they are applied. The expansive pressure of the cushion also imparts the required concavity to the wheel, and as the latter is used the tire, although it may be somewhat loosened, is still held tight by the expansion of the elastic cushion. In case the tension of the latter should become inadequate it may be increased by merely pressing the flange 4 or 5 inward somewhat, thereby compressing the cushion in width and adding to its expansive force.

Should the ends of the tenons project by their shoulders becoming embedded in the rim they will merely compress the elastic cushion 2 and thereby increase its expansive force, so that this result, which has heretofore been a serious objection, is converted by my invention into a positive benefit.

Instead of heating the tire, as described, it may be rolled down upon the elastic cushion while cold by following processes which are well known in the art.

A plate 6 is placed upon the rim or felly 1 at each joint therein before the cushion 2 is applied, the triangular portions of said plate being pressed against the lateral faces of the rim over the joint and fastened by a bolt, rivet, or other suitable means. This plate aids in maintaining the parts in proper relation to each other when the wheel is in use and removes excessive strain from the flanges of the tire at the points named.

The flange 5 of the tire, which is bent outward when the tire is placed on the rim of the wheel, is compressed upon the rim and cushion preferably by the use of the rolls 7 and 8. (Shown in Fig. 4.) These rolls are carried by shafts 9, having parallel axes, and supported in boxes 10, which may be moved to cause said rolls to approach each other. The roll 7 is cylindrical in form, its surface substantially parallel with the axis of its shaft, while the roll 8 is practically the frustum of a cone. Its surface forms a small angle with the surface of the roll 7, corresponding with the bevel of the rim of the wheel. The latter is placed between said rolls and turns upon its own center by their revolution, the rolls being gradually brought nearer each other by moving the journal-supports of one or both of the shafts 7 8 as the flange 5 is turned down, sufficient force being exerted at the end of the operation to properly seat the flange 5 upon the inner face of the rim with the required degree of compression. This movement of the rolls 7 and 8 or of one of said rolls only is effected by means which are so well known in the art of rolling metals that it is unnecessary to illustrate or describe the same in this application.

What I claim is—

1. A vehicle wheel comprising a rim, a tire having flanges and an elastic cushion normally of greater width than the rim and of greater thickness than the space occupied by it between the tire and the rim, the tire having its flanges overlapping the sides of the rim and being compressed against the face and sides of the cushion and against the sides of the rim, as set forth and for the purpose set forth.

2. A vehicle wheel comprising a tapered rim, a tire having tapered flanges and an elastic cushion normally of greater width than the rim and of greater thickness than the space occupied by it between the tire and the rim, the tire having its flanges overlapping the sides of the rim and being compressed against the face and sides of the cushion and against the sides of the rim, as set forth and for the purpose set forth.

In testimony whereof I have hereunto set my hand and affixed my seal in presence of two subscribing witnesses.

HOWARD M. DU BOIS. [L. S.]

Witnesses:
JAMES L. NORRIS,
GEO. W. REA.